United States Patent [19]

Alexander

[11] Patent Number: 4,530,962
[45] Date of Patent: Jul. 23, 1985

[54] ELASTOMER MODIFIED UNSATURATED POLYMERS

[75] Inventor: Ian J. Alexander, Wellingborough, England

[73] Assignee: Scott Bader Company Limited, Wellingborough, United Kingdom

[21] Appl. No.: 440,345

[22] Filed: Nov. 9, 1982

[30] Foreign Application Priority Data

Nov. 10, 1981 [GB] United Kingdom ............... 81 33921

[51] Int. Cl.$^3$ .......................... C08K 3/40; C08L 63/08; C08L 63/10; C08L 67/06
[52] U.S. Cl. ..................................... 525/31; 525/111; 525/112; 525/438; 525/524; 525/531; 523/427; 523/500; 523/527
[58] Field of Search ................. 525/111, 112, 31, 524, 525/531, 438; 523/427, 434, 500, 527

[56] References Cited

U.S. PATENT DOCUMENTS

| | | | |
|---|---|---|---|
| 3,674,893 | 7/1972 | Nowak et al. | 525/112 |
| 3,904,813 | 9/1975 | Groff | 525/524 |
| 3,928,491 | 12/1975 | Waters | 525/112 |
| 4,077,927 | 3/1978 | McPherson | 525/524 |
| 4,336,344 | 6/1982 | Craigie | 525/531 |
| 4,350,789 | 9/1982 | Rowe et al. | 525/43 |

FOREIGN PATENT DOCUMENTS

| | | | |
|---|---|---|---|
| 56-115308 | 9/1981 | Japan | 525/112 |
| 994904 | 5/1962 | United Kingdom | 525/31 |
| 1408798 | 10/1975 | United Kingdom | . |

OTHER PUBLICATIONS

The curing of an epoxide adhesive modified by a functionally terminated elastomer is also described in an article by Paul et al., Polymer, (1977), vol. 18, pp. 945-950.

Primary Examiner—Allan M. Lieberman
Attorney, Agent, or Firm—Cushman, Darby & Cushman

[57] ABSTRACT

An elastomer-modified unsaturated polymer comprises an unsaturated polyester or vinyl ester polymer modified by a low molecular weight elastomer. The elastomer has terminal groups provided by an epoxy resin which render it compatible with the unsaturated polymer. These elastomer-modified unsaturated polymers are useful for providing resin compositions which include a cross-linking agent for the unsaturated polymer. The elastomer is soluble in the resin composition, which is curable to provide an unsaturated resin matrix having particles of the modifying elastomer dispersed therein.

10 Claims, No Drawings

ELASTOMER MODIFIED UNSATURATED POLYMERS

FIELD OF THE INVENTION

This invention relates to elastomer modified unsaturated polymers useful for providing resin compositions curable to form fibre reinforced plastics mouldings.

BACKGROUND OF THE INVENTION

Unsaturated thermosetting resins such as polyesters and vinyl esters have, when combined with reinforcements such as glass fibres and cured, good mechanical properties. This has led to the wide acceptance of glass reinforced plastics (GRP) in such diverse applications as, for example, boats, pipes, tanks, car components and building panels.

However they could be improved if the toughness of the resin matrix could be raised so that they did not fail in a brittle mode when subjected to sudden or excessive stress. In this respect they are particularly notch sensitive i.e. they fail due to cracks propagating from small flaws or inclusions within the material or from small nicks on the surface.

Other plastics materials, both thermoset and thermoplastic, suffer from the same defect and it is known for example to improve the toughness (e.g. resistance to impact) of polystyrene by the incorporation of a rubbery component especially as a separate dispersed phase within the polymer which is the continuous phase. By this means fracture energy is increased without significant reduction of other mechanical properties such as modulus or ultimate strength.

The means of forming such a discrete particulate rubbery phase in many polymers including polystyrene, styrene/acrylonitrile copolymers and epoxide resins is well known. Some involve dissolving a suitable elastomer which may be a solid or liquid rubber in the monomer(s) which are subsequently polymerised by a free radical mechanism. In the case of epoxide resins the elastomeric phase is dissolved in the resin which is then cured by the addition of known curing agents with heating if necessary (see G.B. No. 1 408 798 and Paul et al, Polymer 1977, Vol. 18, pages 945-950).

During polymerisation or curing, depending on the polymer to be toughened, the elastomer becomes incompatible with the polymerising matrix and separates as a particulate phase. In the case of thermoplastics such as polystyrene the elastomer becomes a particulate phase through stirring during the polymerisation. With a thermoset system such as an epoxide resin it is necessary to select an elastomer which separates during cure into a particulate phase without agitation. During polymerisation or cure some chemical reactions can occur between the elastomer and the matrix so that the elastomer becomes grafted or cross-linked by the matrix. The amounts of elastomer used can be varied over wide limits but is commonly in the range 5-10% by weight of the total composition.

Attempts have been made to incorporate elastomers within unsaturated polyesters and similar resins but these have only shown minimal or insignificant improvements in fracture energy. They have usually employed elastomers similar to those successfully used with epoxide resins which are low molecular weight polymers or copolymers of butadiene, especially butadiene/acrylonitrile copolymers, with functional terminal groups, normally hydroxyl or carboxyl.

Unfortunately these liquid rubbers have poor solubility in such unsaturated resins so that if the rubber concentration is above about 3% by weight the rubber tends to separate before the resin is cured and forms large globules within the resin or a pool of rubber on the surface. The result is that on curing large rubber particles are formed which do not contribute to the toughness of the composite. If a rubber of greater solubility is used, e.g. hydroxy terminated polyepichlorhydrin, it may not separate into a particulate phase on curing, gives only a very little improvement in toughness, and impairs other desirable mechanical properties.

The importance of solubility in the liquid and curing resins systems can be explained by the fact that polyesters become rigid at only about 20% conversion (as measured by disappearance of double bonds) whereas epoxide resins become rigid at much higher conversions (as measured by disappearance of oxirane groups). For this reason an elastomer must separate into a particulate phase when used with unsaturated resin at a lower conversion than when used with an epoxide resin.

SUMMARY OF THE INVENTION

Surprisingly, I now find that when low molecular weight elastomers are modified by reaction with low molecular weight epoxide resins (i) their compatibility with unsaturated polymers such as polyesters is increased so that they may be dissolved to the extent of at least 20% by weight of the total weight of unsaturated polymer, elastomer and any cross-linking monomer which may be present, (ii) they do not separate on storage (iii) they form a well dispersed particulate phase on curing of an unsaturated resin containing them and (iv) they substantially increase fracture energy without detracting from other mechanical properties.

In accordance with the invention, an unsaturated polyester or vinyl ester polymer is modified by a modifying polymer which is the reaction product of a low molecular weight elastomer and a low molecular weight epoxy resin. The epoxy resin provides the elastomer with terminal groups which render it compatible with the unsaturated polyester.

The elastomer modified unsaturated polymer may be incorporated in a resin composition containing a cross-linking agent for the unsaturated polymer the cross-linking agent preferably being present in an amount of from 10 to 50% by weight based on the weight of unsaturated polyester or vinyl ester polymer, modifying polymer and vinyl monomer. Because of the compatibility of the modifying polymer with the unsaturated polyester or vinyl ester polymer, the modifying polymer may be soluble in the resin composition to an amount of up to 20% of the modifying polymer by weight of the total weight of unsaturated polyester or vinyl ester polymer, modifying polymer and cross-linking agent.

The resin composition may be made up by dissolving the unsaturated polyester or vinyl ester polymer in the cross-linking agent and then dissolving the modifying polymer in the resultant resin. Alternatively, the modifying polymers may be blended with the unsaturated polyester or vinyl ester polymer and the resultant elastomer-modified polymer blended with the cross-linking agent.

On curing the resin composition a plastics material is produced which comprises a cured unsaturated resin matrix having particles of the modifying polymer dispersed therein.

The elastomer component from which the modifying polymer is prepared preferably has a maximum molecular weight of about 4000, a preferred molecular weight range being about 3500–4000.

The epoxide component providing the terminal groups of the modifying polymer preferably has a maximum molecular weight of about 500, a preferred molecular weight range being about 340–500, more preferably 350–500.

Preferably, the elastomer component is a liquid at ambient temperature and more preferably remains in liquid form after reaction with the epoxy resin.

A particularly preferred resin composition is a liquid at ambient temperature, the modifying polymer being in solution in the composition.

Any of the conventional cross-linking agents used in thermosetting resins may be employed and unsaturated monomers, preferably liquid vinyl monomers such as styrene are preferably used. However, for certain unsaturated polymers, a solid vinyl monomer is preferred.

The amount of modifying polymer in the resin composition is preferably less than the saturation concentration thereof in the composition. A particularly preferred composition contains from about 2.5 to 20%, more preferably 5 to 10% of modifying polymer based on the total weight of unsaturated resin (i.e. unsaturated polymer and cross-linking agent) and modifying polymer.

Unsaturated polyesters which may be used are those made by polyesterification of $\alpha,\beta$-unsaturated dicarboxylic acids or anhydrides, with or without saturated dicarboxylic acids or anhydrides and one or more glycols. The polyesters thus formed may, prior to blending with the modifying polymer, be dissolved in a vinyl type monomer with the incorporation of one or more inhibitors to give storage stability.

Typical ingredients that can be used to manufacture such polyester resin composition are:
  (i) Unsaturated dicarboxylic acids—maleic anhydride, fumaric acid, itaconic acid.
  (ii) Saturated dicarboxylic acids—phthalic anhydride, isophthalic acid, terephthalic acid, tetrahydrophthalic anhydride, hexahydro-phthalic anhydride, endomethylene tetrahydrophthalic anhydride, tetrachlorophthalic anhydride, tetrabromophthalic anhydride, chlorendic acid, succinic acid, adipic acid, azelaic acid, sebacic acid.
  (iii) Glycols—ethylene, diethylene, propylene, dipropylene, neopentyl and dibromoneopentyl glycol, 1,3-propane-diol, butanediols, 1,6-hexanediol, hydrogenated Bisphenol A, ethylene and propylene oxide adducts of Bisphenol A and similar 4,4-diphenols, 2,2,4-trimethyl-1,3-pentane-diol, 1,4-cyclohexane dimethanol or compounds with an oxirane group behaving as glycols e.g. ethylene oxide, propylene oxide, glycidyl ethers.
  (iv) Vinyl monomers—styrene, vinyl toluene, chlorostyrene, bromostyrene, $\alpha$ methyl styrene, t butyl styrene, methyl methacrylate, diallyl phthalate, methylene bis acrylamide, 1-6-hexane-diol fumarate, triallyl cyanurate.
  (v) Inhibitors—hydroquinone and ring substituted hydroquinones, benzoquinone and ring substituted benzoquinones, 1,4 naphthaquinone, copper naphthenate, quaternary compounds.

Minor quantities of mono and poly functional hydroxyl and carboxyl containing compounds such as benzoic acid, penta-erythritol, trimethylol propane, glycerol, trimellitic acid may be incorporated into the unsaturated polyester during manufacture thereof. Dicyclo-pentadiene may also be added during manufacture.

Suitable vinyl ester polymer resins are, for example, made by an addition between epoxide resins and acrylic or methacrylic acids again dissolved in a vinyl monomer.

When the vinyl monomer is a liquid both the polyester and the vinyl ester resins are normally used at 30–50% vinyl monomer content based on the total weight of unsaturated polymer, monomer and the modifying polymer present or to be added. They may be modified by the incorporation of thixotropic agents, fillers and pigments and may be preaccelerated using tertiary amines or cobalt soaps.

The unsaturated polymer may be a crystalline polyester, for example, an unsaturated polyester, 25–55, preferably 30–50, mole % of the acid content of which is a symmetrical aromatic dicarboxylic acid such as that prepared in the manner described in copending U.K. Patent Application No. 82.26723. This can be blended with the modifying polymer and incorporated in an injection moulding pellet as later described. Such crystalline polyesters are not normally admixed with a vinyl monomer prior to blending with the modifying polymer. In this case a vinyl monomer is usually incorporated when making up the pellet, preferably in an amount of about 10% by weight based on the weight of polyester, modifying polymer and vinyl monomer.

Resin compositions of the invention can be cured by means of free radical catalysts such as organic peroxides and heat or by means of organic peroxides plus accelerators (which can be pre-dispersed in the resins as previously stated) at room temperature or even below.

Particularly suitable elastomers which can be epoxy modified are functional-group-terminated low molecular weight synthetic rubbers such as polymers or copolymers of butadiene, especially liquid butadiene/acrylonitrile copolymers with functional end groups. HYCAR®CTBN is particularly suitable, this being a carboxyl group-terminated material available from B. F. Goodrich and ARCO®CN-15 is a hydroxy terminated material, available from ARCO CHEMICALS INC. I chemically modify these liquid rubbers to increase their solubility in unsaturated resins by reaction with low molecular weight epoxide resins which are themselves compatible with the unsaturated polymer and therefore soluble in the resin. For example a carboxyl terminated butadiene/acrylonitrile copolymer can be reacted with sufficient epoxide resin to reduce the acid value of the copolymer to about zero. By using a comparatively short-chain epoxide this can be achieved without excessive chain extention which would give a high viscosity reaction product which would affect the viscosity of the unsaturated resin in which it is dissolved or even more undersirably become insoluble in the unsaturated resin. An epoxy resin which is particularly suitable is the diglycidyl ether of bisphenol A, and Epikote®828 is suitable, consisting as it does of the desired diglycidyl ether and a minor proportion of its low molecular weight analogues. To provide a modified liquid butadiene copolymer rubber soluble to the extent of at least 20% by weight in an unsaturated resin at least one mole of Epikote ®828 should be reacted with each carboxyl group on the liquid rubber.

As an alternative to the above mentioned carboxyl group the functional groups of the elastomer for reaction with the epoxy resin may, for example, be amino or hydroxy. However, carboxyl is particularly preferred.

If the liquid rubber does not contain terminal carboxyl groups or other groups which react readily with epoxy resins they can be modified to provide carboxyl groups e.g. hydroxyl end groups (which although capable of reacting directly with epoxy groups are less preferred) can be reacted with one mole per hydroxyl group of di- or polycarboxylic acid anhydrides such as maleic anhydride, phthalic anhydride, tetrahalophthalic anhydrides, endomethylene tetrahydrophthalic anhydride, tetrahydrophthalic anhydride, hexahydrophthalic anhydride, trimellitic anhydride, succinic anhydride and substituted succinic anhydrides, so that free carboxyl groups and left at each end of the chain.

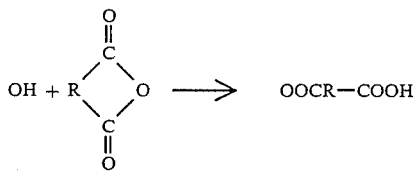

These carboxyl ended chains can then be reacted with epoxide resins as previously described.

The reaction of the carboxyl terminated rubber with the epoxy resin can be carried out by well known techniques, e.g. by direct reaction at temperatures of 110°–150° C. in an inert atmosphere or by heating in a solvent followed by distillation to remove the solvent. Many catalysts for the reaction are known but these should be avoided as a number can interfere with the subsequent cure of the unsaturated resin.

Once the reaction is completed as determined by the free acid content of the reaction product and any solvent removed it is convenient to add a quantity of monomer as used in the unsaturated resin, to reduce the viscosity of the liquid product and facilitate its subsequent incorporation in the unsaturated resin. Inhibitors such as hydroquinone and copper naphthenate can be added to the product in order to obtain a good storage stability.

The modified liquid rubber can be combined with unsaturated resin dissolved in vinyl monomer in any convenient manner e.g. by addition with stirring until a homogeneous composition is obtained. It has been found advantageous to warm the modified liquid rubber solution to 60°–70° C. and slowly add the unsaturated resin with stirring until a homogeneous solution is obtained.

Such solutions, which may contain up to about 20% by weight of modified liquid rubber, are cooled and have a good shelf life.

These combinations have viscosities similar to those of the normal unsaturated polyester resins and can be handled in the same manner. They can be combined with, for example, thixotropic agents, fillers and pigments and used to manufacture GRP by the standard moulding techniques, e.g. hand lay up, spray lay up, cold or hot press moulding, filament winding or pultrusion.

Alternatively, the modifying polymer may be used in unsaturated polyester moulding compositions in the form of e.g. injection moulding pellets, where solid, rather than liquid, monomers are often used. In this applicaton the epoxy modified liquid rubbers of this invention may be blended with the crystalline polyester at elevated temperature whilst the latter is in the liquid state. After cooling to ambient temperature the solid blend may be crushed as required prior to admixing with the other components of the resin moulding composition such as solid vinyl monomer, catalyst, fillers and mould release agent. These components may be blended by mixing in a powder mixer and passing the mix through a Werner and Pfleiderer twin screw extruder at 80° C. and diced into pellets as described in copending U.K. Patent Application No. 82.26723.

DETAILS OF PREFERRED EMBODIMENTS

The preparation of preferred elastomer-modified unsaturated polymers embodying the invention, their incorporation in resin compositions embodying the invention and the production of moulded articles therefrom will now be described in more detail with reference to the following Examples, Example 4 of which is outside the invention and included for comparison.

EXAMPLE 1

Preparation of Epoxy Modified Hycar CTBN 1300×8

509.0 g of Hycar ®CTBN 1300×8 and 91.60 g of Epikote ®828 were charged to a glass reactor fitted with a stirrer, thermometer, reflux condenser and nitrogen inlet. The reactor was heated to 130°–135° C. over a nitrogen atmosphere and maintained in this temperature range for five hours. The acid value was found to be 0.55 mg KOH/gram resin.

The product was a clear viscous resin.

It was possible to reduce the viscosity of the product by dissolving 600 parts of the epoxy modified Hycar ®CTBN in 400 parts of styrene containing 0.15% wax and 0.75% copper naphthenate solution (1% copper).

EXAMPLE 2

94.3 g of HYCAR 1300×17 (a hydroxy group terminated butadiene/acrylonitrile copolymer), 11.5 g maleic anhydride and 200 g of toluene were charged to a flask fitted with a stirrer and a reflux condenser. The mixture was refluxed for 2 hours and the solvent removed using a rotary evaporator. The acid value of the product was 21.5 mg KOH/g indicating that the addition of the maleic anhydride to the HYCAR 1300×17 was more than 95% complete. This was converted to an epoxy terminated liquid rubber using Epikote ®828 as described in Example 1.

EXAMPLE 3

The compatibility of the epoxy modified liquid rubber product of Example 1 was determined by dissolving 9 parts by weight of the product (not diluted in styrene) in 100 parts of several polyester resins each comprising an unsaturated polyester dissolved in styrene and storing samples of these admixtures in glass vials at room temperature. The sample contained 8.26% of rubber by weight of the total weight of polyester, styrene and rubber. At fixed intervals of time the samples in the vials were examined to determine whether the admixture was clear and uniform or separation of some component had occurred. The results are shown below:

| Resin Type | Crystic ® 600 | Crystic ® 392 | Crystic ® 272 |
|---|---|---|---|
| Liquid Rubber Compatibility | As per Ex. 1 | As per Ex. 1. | As per Ex. 1 |
| 24 hours | C | C | C |
| 7 days | C | C | C |
| 28 days | C | C | C |

C = Compatible
Crystic ® 600 is an unsaturated polyester resin containing glycol units derived from Bisphenol A.
Crystic ® 392 is an unsaturated polyester resin containing glycol units derived from neopentyl glycol.
Crystic ® 272 is an unsaturated polyester resin containing acid units derived from isophthalic acid.

EXAMPLE 4 (COMPARATIVE)

To compare the compatibility of epoxy modified and unmodified liquid rubbers, solutions of a number of other liquid rubbers in polyesters were prepared and observed for signs of rubber separation as described in Example 2.

A 2.5% solution of CN-15 (a hydroxy terminated liquid copolymer of butadiene and acrylonitrile ex ARCO Chemical Co.) in Crystic ®272 showed signs of rubber separation in less than three days. A 2% solution of CN-15 in Crystic ®600 did not show signs of separation in 28 days. A 7.5% solution of CN-15 in Crystic ®600 separated in less than 3 days. A 2.5% solution of Hycar ®CTBN 1300×13 in Crystic ®272 was stable for 3 to 7 days but was stable for at least 28 days in Crystic ®600. At 7.5% concentration Hycar ®CTBN 1300×13 separated from both resins in less than 3 days.

EXAMPLE 5

The epoxy modified liquid rubber of Example 1 (not diluted with styrene) was dissolved in Crystic ®392 to provide a number of compositions of final rubber concentrations 2, 4, 6 and 9 parts by weight per 100 parts by weight of Crystic 392. The respective samples contained 1.96%, 3.85%, 5.66% and 8.26% of rubber by weight of the total weight of polyester styrene and rubber. Solution was obtained by warming the pre-weighed liquid rubber to about 60° C. and then slowly adding the resin while stirring the mixture. Resin plaques 300×300×7.5 mm were produced for each composition by casting between 12 mm thick glass plates, using steel spacers. Catalyst and accelerator was added to each sample before pouring into the mould. Curing was for 24 hours at ambient temperature, after which each plaque was removed from the mould and post cured for 3 hours at 80° C. From each plaque was machined three test pieces each 300×80×7.5 mm for use in a double torsion test. Crack guide grooves, 1 mm deep×0.1 mm wide, were milled down the middle of each face of the specimen, and a sharp pre-crack was introduced into one end of the specimen using a razor blade.

Fracture toughness was determined by the double torsion method at a crosshead speed of 1 mm/minute. The fracture toughness of Crystic 392 not containing any liquid rubber additive was also determined in this way. The results obtained are shown in the following tables.

Using similarly prepared plaques of cast resin the flexural moduli and heat distortion temperatures of the compositions described above were also obtained. These results are also shown in the table following.

| Modifier* p.h.r. | 0 | 2 | 4 | 6 | 9 |
|---|---|---|---|---|---|
| Flexural Modulus (GPa) | 3.5 | 3.2 | 3.1 | 2.8 | 2.7 |
| Heat Deflection Temp (°C.) | 90 | 83 | 84 | 88 | 86 |
| Fracture Energy (Jm$^{-2}$) | 100 | 210 | 350 | 500 | 700 |

*Modifier was made as described in Example 1.

These results show that small additions of the modified liquid rubber produce large increases in fracture energy, which relates to the toughness of the material, with very small reductions in bend stiffness or heat resistance. For example 9 p.h.r. of modifier increased fracture energy 700% for a 23% decrease in modulus.

EXAMPLE 6

200 g of the epoxy modified liquid rubber prepared as in Example 1 was warmed to 100° C. and a solution of 0.2 g paraffin wax and 0.2 g of hydroquinone (33% of weight in Cellosolve ®) in 131.6 g styrene warmed to 50° C. was mixed and the whole stirred until a clear 60% solution was obtained.

925 g of CRYSTIC ®600 (a bisphenol based unsaturated polyester resin) were warmed to 80° C. and 62.5 g of the previously prepared liquid rubber solution were added over a period of 30 minutes with stirring. Stirring was continued until the admixture was quite clear when it was rapidly cooled to room temperature. The mixture contained 3.8% of modified rubber by weight of the total weight of polyester, styrene and rubber.

The cold liquid rubber/resin mixture was catalysed with the addition of 59 p.b.w. 1% cobalt octoate and 20 p.b.w. 50% methyl ethyl ketone peroxide and used to impregnate four layers of glass chopped strand mat (450 g/m$^2$) to obtain a laminate containing 30% glass. After curing for 24 hours at room temperature the completed laminate was post cured at 80° C. for 3 hours.

A similar laminate was made using unmodified CRYSTIC 600 ® and the tensile properties of both laminates were tested in accordance with B.S. 2782 and the results are shown in the table below.

| | RESIN | |
|---|---|---|
| | CRYSTIC 600 | CRYSTIC 600 + liquid rubber |
| Tensile Strength (MPa) | 68 | 83 |
| Elongation of Break (%) | 0.9 | 1.6 |
| Strain to First Failure[1] (%) | 0.6 | 1.4 |
| Limit of proportionality[2] (%) | 0.26 | 0.36 |

[1]as determined by acoustic emission
[2]linear portion of stress/strain curve

These figures all show the increased toughness of the laminate produced from the resin modified with an epoxy terminated liquid rubber.

EXAMPLE 7

60 parts of an epoxy modified HYCAR ®1300X8 prepared as in Example 1 and 240 parts of a crystalline unsaturated polyester prepared from fumaric acid, terephthalic acid and 1,6-hexanediol were blended together with stirring until a uniform melt was obtained. The molten mixture had a viscosity of 24 poise at 150° C. as determined by an ICI Cone and Plate Viscometer. When allowed to cool to ambient temperature a uniform brittle solid was obtained which was ground to a powder (Powder A).

A uniform granular moulding composition was prepared by combining the components listed below in a dry mixer, passing them twice through a Model 3500, Extruder (Baughan (Stroud) Ltd.) at 80° C. before breaking into pellets.

The composition contained 18% of rubber by weight of the total weight of polyester, solid vinyl monomer and rubber.

The components were as follows:

| Powder A | 242 p.b.w. |
| --- | --- |
| Methylene bis-acrylamide | 27 p.b.w. |
| Zinc Stearate (mould release) | 20 p.b.w. |
| Perkadox ® BC40 | 10 p.b.w. |
| Apyral ® 2 (alumina hydrate) | 200 p.b.w. |
| Microdol ® Extra (dolomite) | 200 p.b.w. |
| Milled Glass Fibre XG1691 | 300 p.b.w. |

The granules were compression moulded at 170° C. and 10 MPa to provide plaques from which test specimens were cut. Similar plaques were moulded from granules which contained only crystalline unsaturated polyester without the liquid rubber. The mechanical test results are shown below.

|  | STANDARD | STANDARD AND LIQUID RUBBER |
| --- | --- | --- |
| Ultimate Tensile Strength (MPa) | 27 | 29.2 |
| Elongation at Break (%) | 0.44 | 0.59 |
| Initial Tensile Modulus (GPa) | 11.3 | 7.1 |
| Flexural Strength (MPa) | 64 | 61.5 |
| Flexural Modulus (GPa) | 8.7 | 6.5 |
| Unnotched Charpy Impact (KJ/m$^2$) | 3.8 | 8.9 |
| Notched Izod Impact (J/m) | 28 | 48.8 |
| Gardner Impact (Kg/cm) | 2.5 | 3.7 |

This shows the improved toughness and high impact strengths of the composition containing liquid rubber.

I claim:

1. A heterogeneous elastomer-modified unsaturated polymer comprising (a) an unsaturated polymer selected from unsaturated polyesters and unsaturated epoxy acrylate polymers, the polymer (a) being modified by about 2.5 to 20% of a modifying polymer, which modifying polymer is the reaction product of (b) a low molecular weight elastomer comprising a diene having terminal functional groups and (c) a low molecular weight epoxy resin capable of reaction with said terminal functional groups, which epoxy resin (c) provides terminal groups of the modifying polymer which render the modifying polymer compatible with the unsaturated polymer (a).

2. An elastomer-modified unsaturated polymer according to claim 1, wherein the elastomer has a maximum molecular weight of about 4000 and the epoxy resin has a maximum molecular weight of about 500.

3. An elastomer-modified unsaturated polymer according to claim 1, wherein the elastomer is a butadiene/acrylonitrile copolymer having said terminal functional groups.

4. A resin composition comprising a heterogeneous elastomer-modified unsaturated polymer, which heterogeneous elastomer-modified unsaturated polymer comprises (a) an unsaturated polymer selected from unsaturated polyesters and unsaturated epoxy acrylate polymers, the polymer (a) being modified by about 2.5 to 20% of a modifying polymer, which modifying polymer is the reaction product of (b) a low molecular weight elastomer comprising a diene and having terminal functional groups and (c) a low molecular weight epoxy resin capable of reaction with said terminal functional groups, which epoxy resin (c) provides terminal groups of the modifying polymer which render the modifying polymer compatible with the unsaturated polymer (a), and (d) a cross-linking agent capable of cross-linking with the unsaturated polymer (a).

5. A resin composition according to claim 4, which is a liquid at ambient temperature, the modifying polymer being in solution.

6. A composition according to claim 4, wherein the modifying polymer is present in the composition in an amount of from 5 to 20% inclusive by weight based on the total weight of unsaturated polymer, modifying polymer and cross-linking agent.

7. A composition according to claim 4, wherein the cross-linking agent is present in the composition in an amount of from 10 to 50% inclusive by weight based on the total weight of unsaturated polymer, modifying polymer and cross-linking agent.

8. A composition according to claim 4, wherein the unsaturated polymer is a crystalline polyester.

9. A plastics material formed by curing a composition according to claim 4, which material comprises a cured unsaturated resin matrix having particles of the modifying polymer dispersed therein.

10. A plastics material according to claim 9, which additionally includes reinforcement material.

* * * * *